(12) United States Patent
Yamamoto (10) Patent No.: US 11,728,580 B2
(45) Date of Patent: Aug. 15, 2023

(54) TERMINAL AND TERMINAL FIXING STRUCTURE

(71) Applicant: YAZAKI CORPORATION, Tokyo (JP)

(72) Inventor: Takatatsu Yamamoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/537,372

(22) Filed: Nov. 29, 2021

(65) Prior Publication Data
US 2022/0173533 A1    Jun. 2, 2022

(30) Foreign Application Priority Data
Nov. 30, 2020   (JP) .................................. 2020-198704

(51) Int. Cl.
*H01R 4/30* (2006.01)
*H01R 11/12* (2006.01)

(52) U.S. Cl.
CPC ............. *H01R 4/307* (2013.01); *H01R 4/305* (2013.01); *H01R 11/12* (2013.01)

(58) Field of Classification Search
None
See application file for complete search history.

(56) References Cited

U.S. PATENT DOCUMENTS

| 906,476 | A | * | 12/1908 | Ullmann | ................. | F16B 39/08 |
| | | | | | | 411/197 |
| 998,514 | A | * | 7/1911 | Houghton | ............... | F16B 39/08 |
| | | | | | | 411/197 |
| 4,775,339 | A | * | 10/1988 | Sasaki | ................... | H01R 11/01 |
| | | | | | | 439/883 |
| 6,250,975 | B1 | * | 6/2001 | LaPointe | .................. | H01R 4/64 |
| | | | | | | 439/883 |
| 6,533,619 | B2 | * | 3/2003 | Wakata | ................ | H01R 13/642 |
| | | | | | | 439/680 |
| 6,855,008 | B1 | | 2/2005 | Freitag et al. | | |
| 7,056,161 | B2 | * | 6/2006 | Delcourt | ................... | H01R 4/30 |
| | | | | | | 411/181 |
| 2017/0229796 | A1 | * | 8/2017 | Kitagawa | ............... | H01R 11/12 |

FOREIGN PATENT DOCUMENTS

| JP | H04-47274 U | 4/1992 |
| JP | 2019-160769 A | 9/2019 |

* cited by examiner

*Primary Examiner* — Felix O Figueroa
(74) *Attorney, Agent, or Firm* — Kenealy Vaidya LLP (57) ABSTRACT

A terminal includes: a flat surface portion; an extending portion continuous with the flat surface portion; a branch portion continuous with the extending portion and extending in a direction different from that in which the extending portion extends; and rotation stop portions continuous with the branch portion. When the terminal is attached to a bolt protruding from a fixing member and including a seat separated from the fixing member, the flat surface portion contacts the seat, the rotation stop portions extend from the branch portion toward a base end of the bolt in a protruding direction of the bolt, and at least a pair of the rotation stop portions are positioned to sandwich the seat in a direction intersecting the protruding direction to prevent rotation of the terminal with respect to the bolt.

9 Claims, 6 Drawing Sheets

TERMINAL AND TERMINAL FIXING STRUCTURE

CROSS-REFERENCE TO RELATED APPLICATIONS

This application is based on and claims the benefit of priority of Japanese Patent Application No. 2020-198704 filed on Nov. 30, 2020, the entire contents of which are incorporated herein by reference.

FIELD

The present disclosure relates to a terminal and a terminal fixing structure.

BACKGROUND

An example of a ground terminal that is grounded and fastened to a body of an automobile such as a vehicle body frame or a vehicle body panel will be described below. In the related art, by using the ground terminal, a plurality of electric wires that make up a wire harness used in an electric circuit of a vehicle may be collectively electrically connected (that is, grounded) to the body of the automobile. In a fixing structure of the ground terminal with respect to the body in the related art, there is a method in which the ground terminal and the body are grounded and fastened via a bolt protruding from a body of the vehicle. In the above method, for example, the bolt having a screw portion and a seat is used, and the ground terminal is grounded and fastened to the body by inserting the screw portion into the ground terminal and by the ground terminal contacting the seat (see, for example, JP-A-2019-160769).

SUMMARY

In the above fixing structure of the ground terminal, during an operation until the ground terminal is fastened to the body, the ground terminal may be displaced from a predetermined position, and workability is not excellent. Specifically, since the ground terminal is rotated about the screw portion due to an external factor such as being pulled from an electric wire until the ground terminal into which the screw portion is inserted is fastened to the body via the bolt, a fixing operation the ground terminal is complicated.

On the other hand, there is a method in which, in one of ground terminals in the related art, a claw portion is provided on the ground terminal and the seat of the bolt is formed in a polygonal shape in order to prevent the above rotation. Accordingly, the claw portion of the ground terminal is hooked to at least one corner of the seat of the bolt to prevent the rotation. In the above method of preventing the rotation of the ground terminal, when the ground terminal is fastened to the body, a mounting angle of the ground terminal with respect to the seat depends on a shape of the seat of the bolt. Specifically, for example, the seat being hexagonal can correspond to the mounting angle rotating at every 60°. However, it is difficult to deal with a case where the electric wire is pulled or loosened, because the ground terminal can be rotated only at every 60° (that is, a width of the angle is large). On the contrary, when the seat is made octagonal or more and the mounting angle is subdivided, the angle becomes an obtuse angle and becomes close to a circle, so that it becomes difficult to prevent the rotation. Thus, in the method described above, although the rotation of the ground terminal can be prevented, there is room for improvement from a viewpoint of the workability.

There is also a method of preventing the rotation by providing a hole in the body and inserting a part of the ground terminal into the hole, but infiltration of water from the hole and rusting of the body may reduce conductivity between the ground terminal and the body. That is, in the ground terminal in the related art, it is difficult to improve the workability without reducing the conductivity with a fixing member.

The present disclosure has been made in view of the above circumstances, and an object thereof is to provide a terminal and a terminal fixing structure excellent in workability without reducing conductivity between the terminal and a fixing member.

The present disclosure provides a terminal attachable to a bolt, the bolt protruding from a fixing member and including a seat separated from the fixing member, the terminal being electrically connected to the fixing member when the terminal is attached to the bolt, the terminal including: a flat surface portion; an extending portion continuous with the flat surface portion and extending to form a same surface as a surface of which the flat surface portion extends; a branch portion continuous with the extending portion and extending to form a same surface as the surface of which the flat surface portion extends, the branch portion extending in a direction different from a direction in which the extending portion extends; and a plurality of rotation stop portions continuous with the branch portion, wherein when the terminal is attached to the bolt by insertion of the bolt into the flat surface portion, the flat surface portion contacts the seat, the plurality of rotation stop portions extend from the branch portion toward a base end of the bolt in a protruding direction of the bolt, and at least a pair of the plurality of rotation stop portions are positioned to sandwich the seat in a direction intersecting the protruding direction to prevent rotation of the terminal with respect to the bolt.

Thus, according to the present disclosure, it is possible to provide the terminal and the terminal fixing structure excellent in workability without reducing the conductivity between the terminal and the fixing member.

The present disclosure has been briefly described as above. Further, details of the present disclosure will be further clarified by reading a mode for carrying out the disclosure described below with reference to the accompanying drawings.

DETAILED DESCRIPTION

Embodiment

Hereinafter, a ground terminal 10 and a fixing structure 1 of the ground terminal 10 according to an embodiment of the present disclosure will be described with reference to the drawings. In the example shown in FIG. 1, the fixing structure 1 of the ground terminal 10 shows a state in which a screw portion 22 of a bolt 20 is inserted into a through hole 11a of the ground terminal 10, a flat surface portion 11 and a seat 21 are in contact with each other, and a rotation stop portion 14 sandwiches the seat 21 in a left-right direction to prevent rotation.

In the present embodiment, a terminal is referred to as the "ground terminal 10", and a fixing member is referred to as a "body 30". At the ground terminal 10, an end of an electric wire 40 is crimped to a crimp portion 18 so as to be electrically connected to the electric wire 40.

Figure 1:
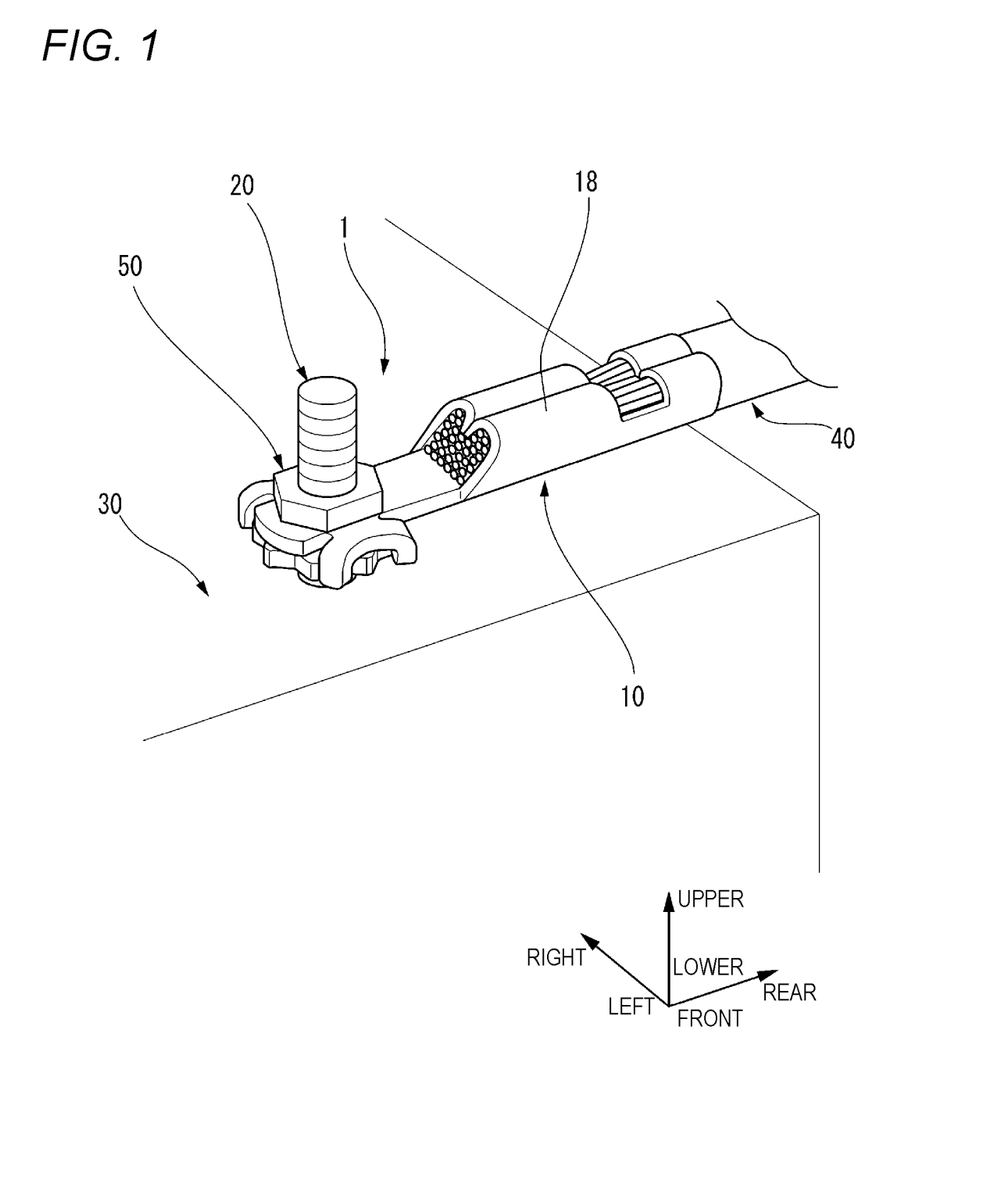
FIG. 1 is a perspective view showing a fixing structure of a ground terminal according to a present embodiment.
Figure 2:
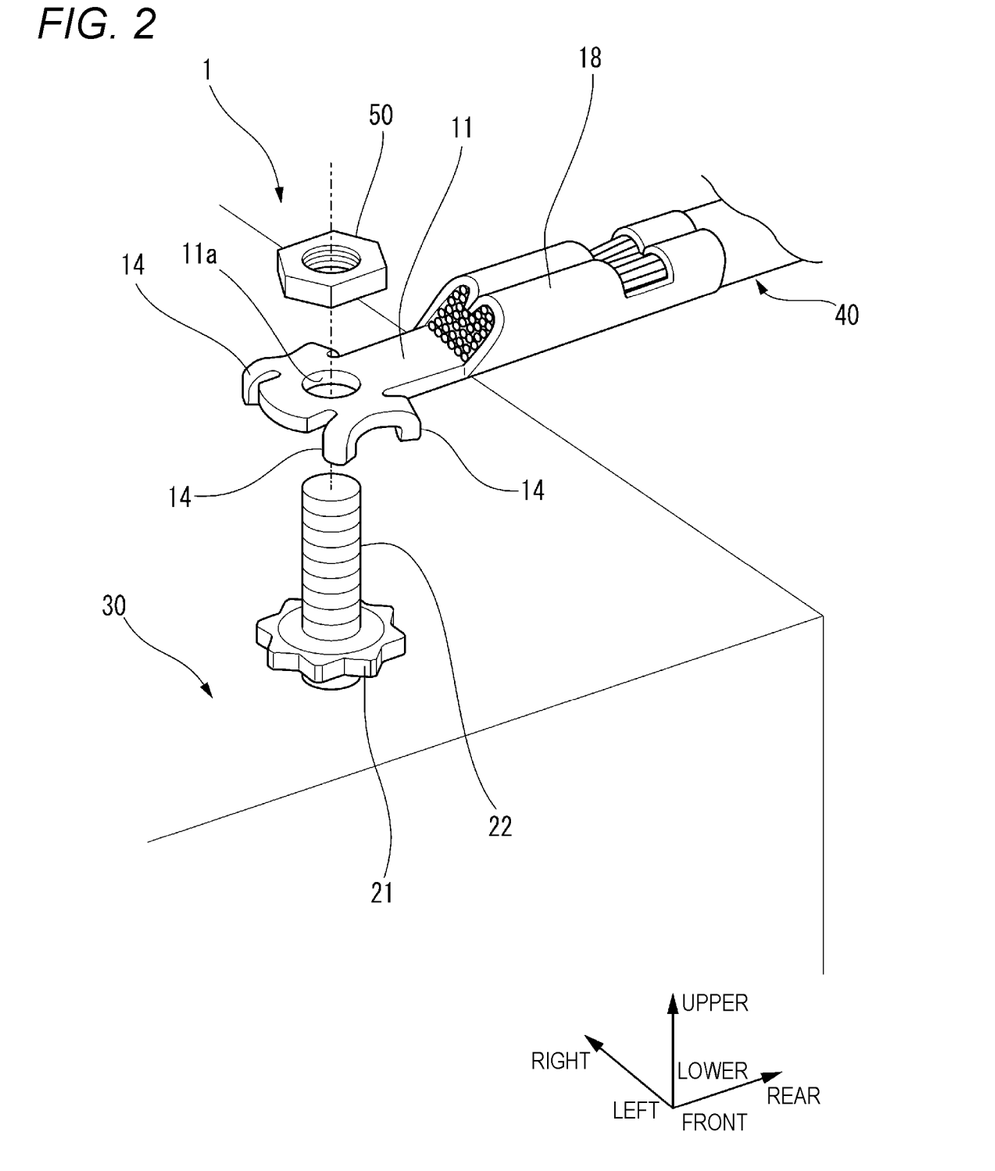
FIG. 2 is an exploded perspective view of the fixing structure shown in FIG. 1.

Hereinafter, for convenience of description, a "front-rear direction", an "upper-lower direction", the "left-right direction", a "front", a "rear", "upper", "lower", "left", and "right" are defined as shown in FIGS. 1 and 2. The "front-rear direction", the "upper-lower direction", and the "left-right direction" are orthogonal to one another. The left-right direction is left and right when the ground terminal is viewed from above (see FIG. 3).

In the fixing structure 1 according to the present embodiment, as shown in FIG. 1, a nut 50 is used for the bolt 20 so as to protrude upward from the body 30, and the ground terminal 10 to which the end of the electric wire 40 is crimped is fastened and fixed so as to be electrically connected to the electric wire 40. At this time, the ground terminal 10 and the body 30 are electrically connected via the bolt 20. In the present embodiment, the ground terminal 10 is fastened (fixed) to the bolt 20 by using the nut 50, but a different member may be used as long as the ground terminal 10 is fixed.

Figure 3:
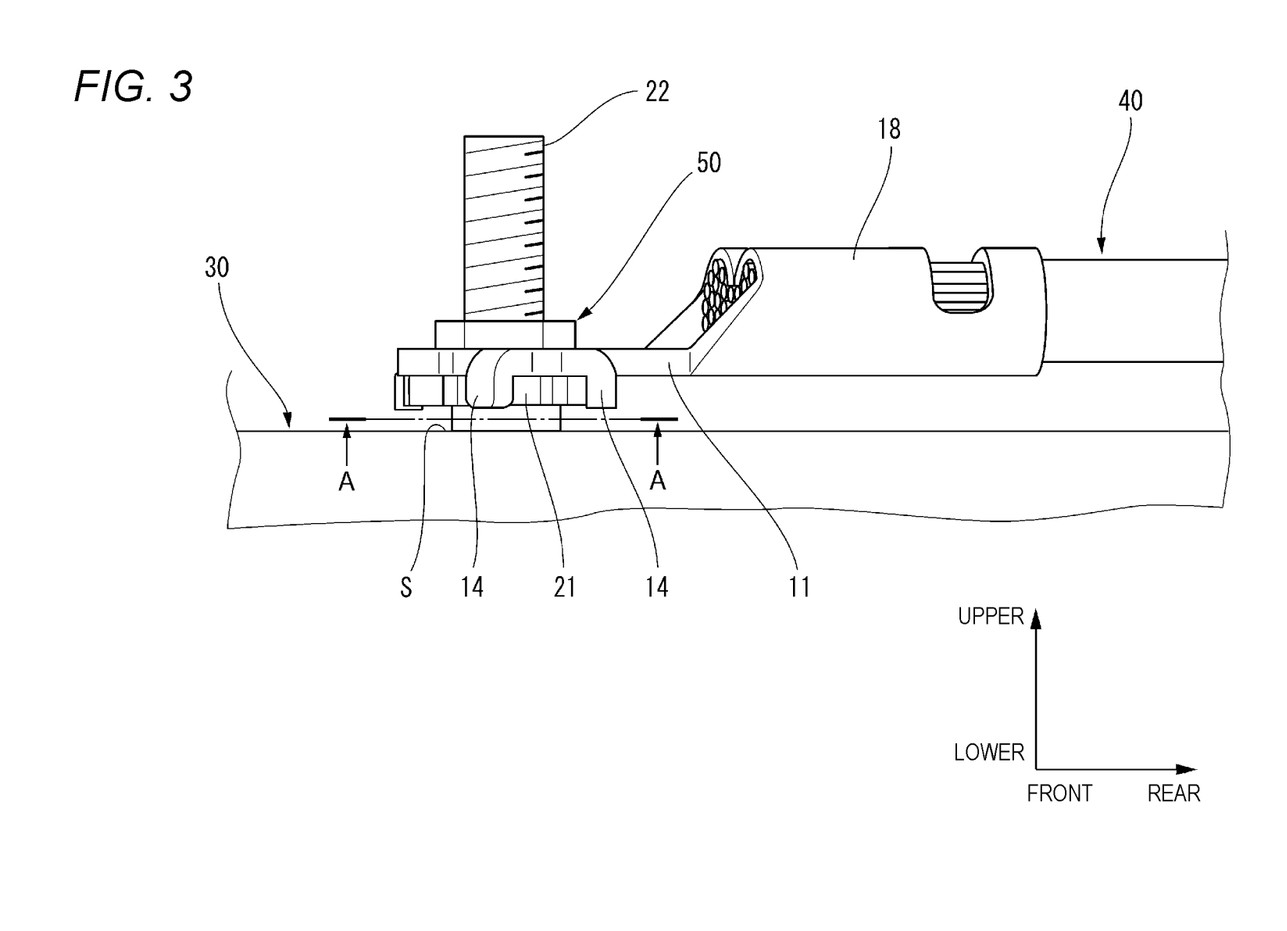
FIG. 3 is a side view of the fixing structure shown in FIG. 1.

First, the ground terminal 10 will be described. The ground terminal 10 is formed of a conductive member. As shown in FIGS. 1 to 3, the ground terminal 10 is fixed to the body 30 from an upper side of the body 30 via the bolt 20.

As shown in FIGS. 1 to 4, the ground terminal 10 includes the flat surface portion 11, a pair of extending portions 12, a pair of branch portions 13, and the rotation stop portion 14. Further, the ground terminal 10 also includes the crimp portion 18 on which the end of the electric wire 40 is placed and the end of the electric wire 40 is crimped.

As shown in FIGS. 1 to 4, the flat surface portion 11 has a substantially rectangular flat plate shape whose rear end extends from the crimp portion 18 along the front-rear direction and toward a front side. The through hole 11a into which the screw portion 22 of the bolt 20 is inserted is provided on a front end side of the flat surface portion 11.

Figure 4:
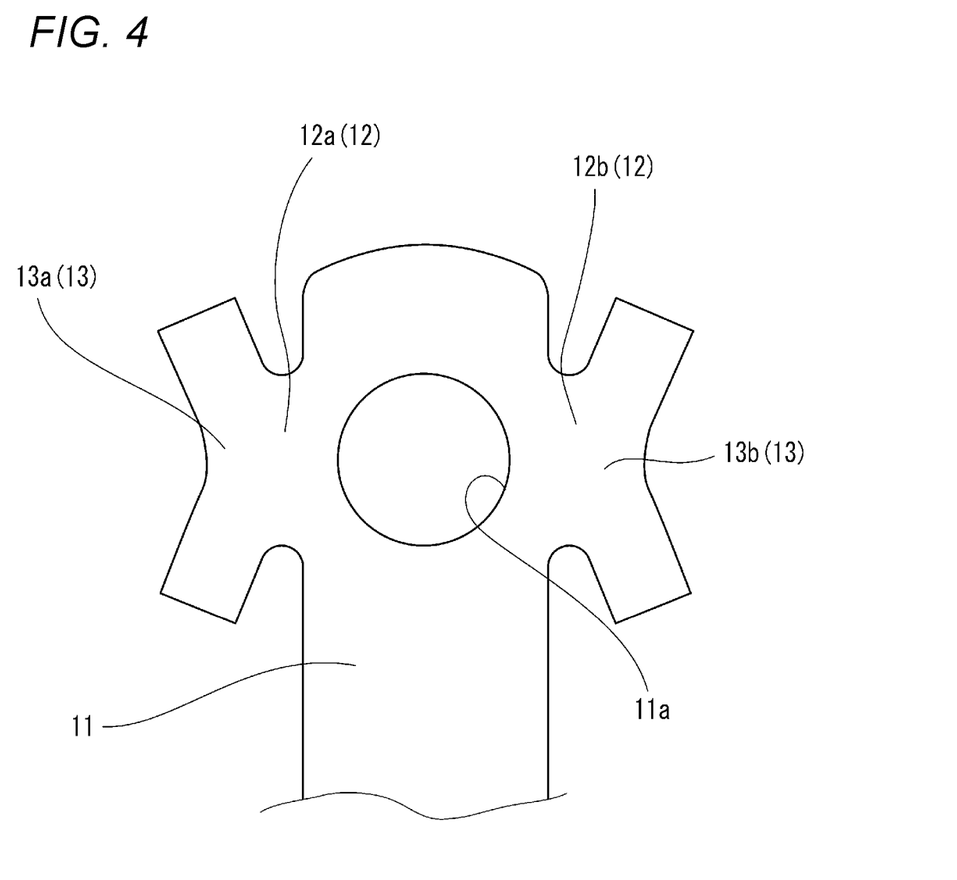
FIG. 4 is a front view of a part of the ground terminal according to the present embodiment as viewed from above.

In particular, as shown in FIG. 4, the pair of extending portions 12 extend in the left-right direction from side faces of the flat surface portion 11 in the left-right direction. Specifically, an extending portion 12a provided on a right side face of the flat surface portion 11 extends along the left-right direction and toward a right side, and an extending portion 12b provided on a left side face of the flat surface portion 11 extends along the left-right direction and toward a left side. The pair of extending portions 12 sandwich the flat surface portion 11 in the left-right direction.

In particular, as shown in FIG. 4, the pair of branch portions 13 extend in a direction different from the direction in which each extending portion 12 extends. Specifically, a branch portion 13a on a side of the extending portion 12a has a substantially V shape having a portion extending on the front side and the right side and a portion extending on a rear side and the right side, and a branch portion 13b on a side of the extending portion 12b has a substantially V shape having a portion extending on the front side and the left side and a portion extending on the rear side and the left side. The pair of branch portions 13 sandwich the flat surface portion 11 and the extending portion 12 in the left-right direction.

The rotation stop portion 14 extends from each end portion of the pair of branch portions 13 toward a lower side along the upper-lower direction. In other words, the rotation stop portion 14 has a shape in which the branch portion 13 is bent toward the lower side. Thus, two rotation stop portions 14 are provided at each of the branch portion 13a and the branch portion 13b.

An end surface of the rotation stop portion 14 is positioned on the lower side relative to a surface of the bolt 20 facing the body 30. In other words, a length of the rotation stop portion 14 in the upper-lower direction is longer than a length (that is, a thickness) of the seat 21 of the bolt 20 to be described later in the upper-lower direction (see FIG. 3). The length of the rotation stop portion 14 in the upper-lower direction may be shorter than the length of the seat 21 in the upper-lower direction.

The rotation stop portion 14 on the left side and the front side is referred to as a "rotation stop portion 14a", the rotation stop portion 14 on the left side and the rear side is referred to as a "rotation stop portion 14b", the rotation stop portion 14 on the right side and the rear side is referred to as a "rotation stop portion 14c", and the rotation stop portion 14 on the right side and the front side is referred to as a "rotation stop portion 14d".

Next, the bolt 20 will be described. The bolt 20 is formed of a conductive member. As shown in FIGS. 1 to 3, the bolt 20 is formed integrally with the body 30. The bolt 20 includes the seat 21 that is in contact with the flat surface portion 11, and the screw portion 22 that is inserted into the through hole 11a.

Figure 5A:
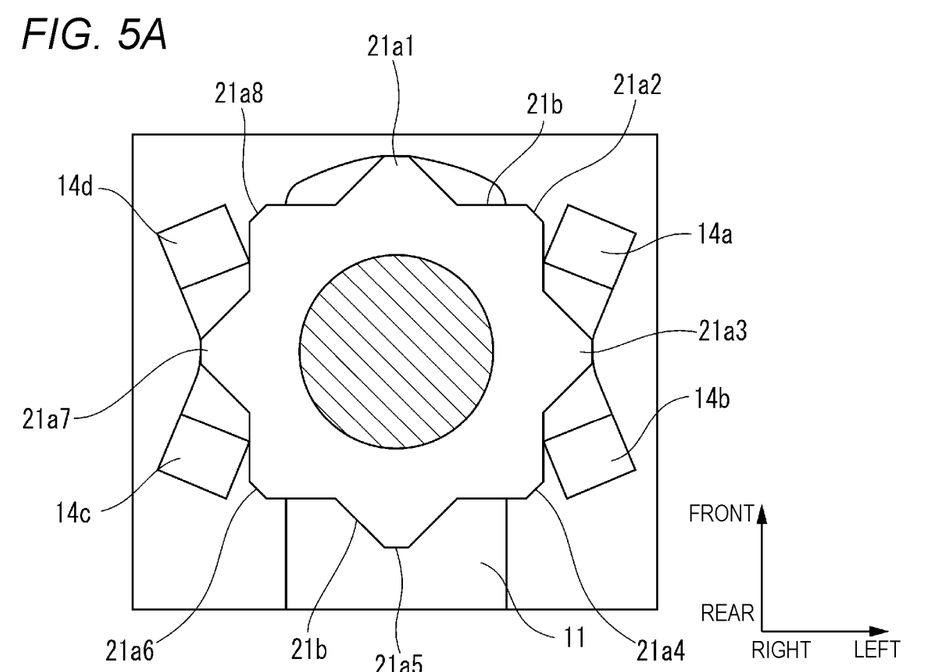
FIG. 5A is a cross-sectional view taken along a line A-A shown in FIG. 3.
Figure 5B:
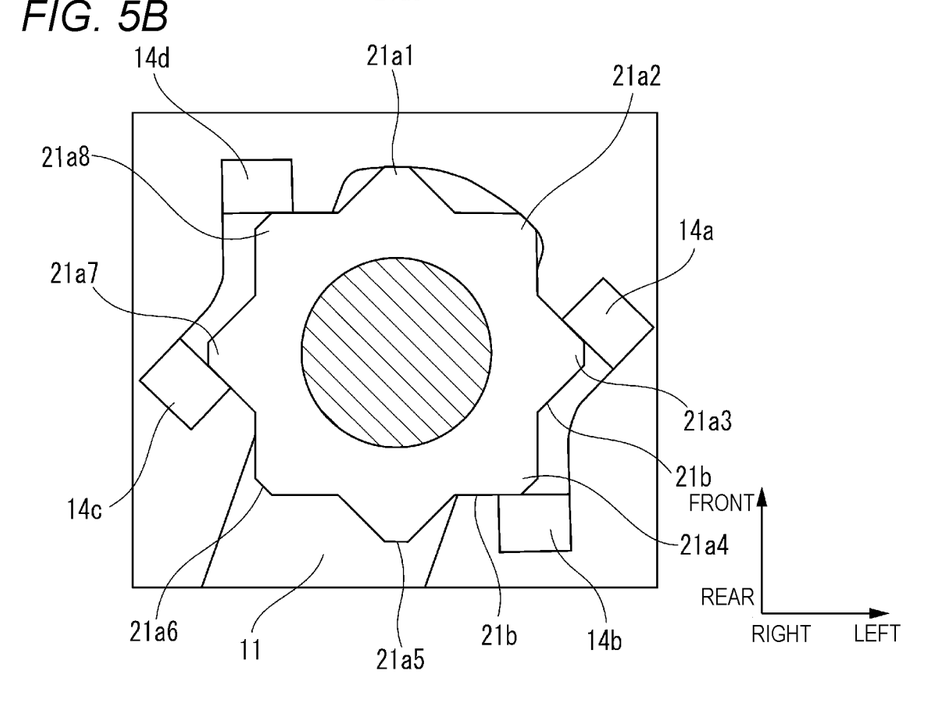
FIG. 5B is a view corresponding to FIG. 5A fixed at an angle different from that of FIG. 5A.

In particular, as shown in FIGS. 5A and 5B, the seat 21 has a substantially star-shaped octagonal shape. That is, on an outer peripheral surface (that is, the outer peripheral surface in a circumferential direction) along the upper-lower direction of the seat 21, a convex portion 21a and a concave portion 21b are continuously adjacent along the circumferential direction. The convex portion 21a is a portion protruding outward in the circumferential direction, and the concave portion 21b is a portion recessed inward in the circumferential direction. The convex portion 21a includes convex portions 21a1 to 21a8.

As shown in FIG. 3, the seat 21 is separated from the body 30. In other words, the seat 21 is provided so that a gap S is defined between the seat 21 and the body 30. Since the gap S is defined between the seat 21 and the body 30, the length of the rotation stop portion 14 in the upper-lower direction can be made longer than the length of the seat 21 in the upper-lower direction.

Next, the fixing structure 1 of the ground terminal 10 will be described. FIG. 5A is a view showing a state where the rotation stop portion 14 and the seat 21 are engaged with each other in a mode shown in FIGS. 1 to 3. FIG. 5B is a view showing a state where the rotation stop portion 14 is rotated to a left by 22.5° from the state shown in FIG. 5A.

The ground terminal 10 is positioned so that the rotation stop portion 14 sandwiches the seat 21 at an intermediate stage of being fixed to the body 30 via the bolt 20 (that is, during a fixing operation of the ground terminal) and at a fixing completion stage, and the rotation stop portion 14 is engaged with the seat 21 as shown in FIGS. 5A and 5B.

Specifically, the ground terminal 10 is attached to the bolt 20 such that the rotation stop portion 14a and the rotation stop portion 14b, and the rotation stop portion 14c and the rotation stop portion 14d sandwich the convex portion 21a3 and the convex portion 21a7 (see FIG. 5A). At this time, the rotation stop portion 14a and the rotation stop portion 14d, and the rotation stop portion 14b and the rotation stop portion 14c are positioned so as to sandwich two concave portions 21b adjacent to each other in the circumferential direction of the seat 21.

More specifically, the rotation stop portion 14a and the rotation stop portion 14d sandwich the seat 21 in the left-right direction. At this time, an end portion on a right side (a left side in a sheet of FIGS. 5A and 5B) and a rear side of the rotation stop portion 14a contacts a side face of the convex portion 21a2, and an end portion on a left side and a rear side of the rotation stop portion 14d contacts a side face of the convex portion 21a8. Thus, by sandwiching the seat 21 by the rotation stop portion 14a and the rotation stop portion 14d, clockwise and counterclockwise rotation of the ground terminal 10 with respect to the seat 21 is prevented.

Similarly, the rotation stop portion 14b and the rotation stop portion 14c sandwich the seat 21 in the left-right direction, an end portion on a right side and a front side of the rotation stop portion 14b contacts a side face of the convex portion 21a4, and an end portion on a left side and a front side of the rotation stop portion 14c contacts a side face of the convex portion 21a6. Thus, the clockwise and counterclockwise rotation of the ground terminal 10 with respect to the seat 21 is prevented.

By sandwiching the seat 21 by the rotation stop portion 14a and the rotation stop portion 14c, the counterclockwise rotation is prevented, but the clockwise rotation is not prevented. However, by sandwiching the seat 21 by the rotation stop portion 14b and the rotation stop portion 14d, the clockwise rotation is prevented.

The grounding terminal 10 can be attached to the bolt 20 such that the rotation stop portion 14a and the rotation stop portion 14b sandwich one concave portion 21b, and the rotation stop portion 14c and the rotation stop portion 14d sandwich one concave portion 21b (see FIG. 5B). At this time, the rotation stop portion 14a and the rotation stop portion 14d, and the rotation stop portion 14b and the rotation stop portion 14c are positioned so as to sandwich two convex portions 21b adjacent to each other in the circumferential direction of the seat 21.

Specifically, the rotation stop portion 14a and the rotation stop portion 14b sandwich the seat 21 in the front-rear direction. At this time, a rear side face of the rotation stop portion 14a contacts a side face of the convex portion 21a3, and a front side face of the rotation stop portion 14b contacts the side surface of the convex portion 21a4. Thus, by sandwiching the seat 21 by the rotation stop portion 14a and the rotation stop portion 14b, the clockwise and counterclockwise rotation of the ground terminal 10 with respect to the seat 21 is prevented.

Similarly, the rotation stop portion 14c and the rotation stop portion 14d sandwich the seat 21 in the front-rear direction, and a front side face of the rotation stop portion 14c contacts a side face of the convex portion 21a7, and a rear side face of the rotation stop portion 14d contacts the side face of the convex portion 21a8. Thus, the clockwise and counterclockwise rotation of the ground terminal 10 with respect to the seat 21 is prevented.

By sandwiching the seat 21 by the rotation stop portion 14a and the rotation stop portion 14c, the clockwise rotation is prevented, but the counterclockwise rotation is not prevented. However, by sandwiching the seat 21 by the rotation stop portion 14b and the rotation stop portion 14d, the counterclockwise rotation is prevented.

In the fixing structure 1 shown in FIG. 5A, the contact between the rotation stop portion 14 and the convex portion 21a is so-called point contact, and in the fixing structure 1 shown in FIG. 5B, the contact between the rotation stop portion 14 and the convex portion 21a is so-called face contact. Whether the contact between the rotation stop portion 14 and the convex portion 21a is the point contact or the face contact, there is no substantial difference in an effect of preventing the rotation of the ground terminal 10. In the fixing structures 1 shown in FIGS. 5A and 5B, the rotation stop portion 14 and the convex portion 21a are in contact with each other, but a gap of a manufacturing tolerance is allowed.

In the ground terminal 10 according to the present embodiment in which the rotation is prevented as described above, a mounting angle of the ground terminal 10 with respect to the bolt 20 can be changed every 22.5°. Therefore, the mounting angle can be finely adjusted according to pulling and bending of the electric wire 40.

Operation and Effect

According to the ground terminal 10 of the present embodiment, the ground terminal 10 includes the flat surface portion 11 that contacts the seat 21 of the bolt 20, the extending portion 12 that extends on the same surface as a surface on which the flat surface portion 11 extends, the branch portion 13 that extends on the same surface as the surface on which the flat surface portion 11 extends and extends in a direction different from the extending portion, and a plurality of rotation stop portions 14 that extend toward the seat 21 along a standing (or protruding) direction of the bolt 20. The ground terminal 10 according to the present embodiment is applied to the bolt 20 in which the seat 21 is separated from the body 30, and is electrically connected to and fastened to the body 30 by the bolt 20. Specifically, the screw portion 22 of the bolt 20 is inserted into the flat surface portion 11 of the ground terminal 10, and the flat surface portion 11 contacts the seat 21 to be electrically connected to the body 30 via the bolt 20. Then, by positioning at least a pair of rotation stop portions 14 so as to sandwich the seat 21, the rotation of the ground terminal 10 with respect to the bolt 20 is prevented. Thus, in the ground terminal 10 according to the present embodiment, since the rotation of the ground terminal 10 is prevented, a complexity of the fixing operation of the ground terminal 10 with respect to the body 30 is eliminated. In addition, since the ground terminal 10 includes the extending portion 12 and the branch portion 13 extending on the same surface as the flat surface portion 11, a contact area with the seat 21 is increased, and thus conductivity with the body 30 is improved as compared with a terminal in the related art. As a result, the ground terminal 10 according to the present embodiment is excellent in workability while improving the conductivity with the body 30.

Further, the end surface of the rotation stop portion 14 is positioned on the lower side in the upper-lower direction relative to the surface on the seat 21 facing the body 30, and compared with the terminal in the related art, the contact area (so-called engagement allowance) between the rotation stop portion 14 and the seat 21 is secured. As a result, in the ground terminal 10 according to the present embodiment, the rotation of the ground terminal 10 with respect to the bolt 20 is prevented as compared with the terminal in the related art.

Further, since a temporary locking portion (temporary locking protrusion 15a, inclined portion 15b, and a plurality of small protrusions 15c), which is a part of the rotation stop portion 14, can be engaged with the seat 21 of the bolt 20, displacement along the upper-lower direction is prevented. Specifically, even when the displacement in which the flat surface portion 11 is separated from the seat 21 along the upper-lower direction occurs in the ground terminal 10, the temporary locking portion (temporary locking protrusion 15a, inclined portion 15b, and the plurality of small protrusions 15c) interfere with the seat 21. As a result, in the ground terminal 10 according to the present embodiment, not only the rotation but also the displacement along the upper-lower direction (so-called disconnection or detachment of the terminal) is prevented.

Since the ground terminal 10 according to the present embodiment is applied to the bolt 20 in which the seat 21 is separated from the body 30 (that is, the gap S is defined by the seat 21 and the body 30), the ground terminal 10 can be configured as described above.

According to the fixing structure 1 of the present embodiment, since the ground terminal 10 as described above is applied to the bolt 20 in which the gap S is defined by the seat 21 and the body 30, the workability is also excellent while the conductivity between the ground terminal 10 and the body 30 is being improved.

Other Embodiments

The present disclosure is not limited to the above embodiment, and modifications, improvements, and the like can be made as appropriate. In addition, a material, shape, size, number, arrangement position, and the like of each component in the above embodiment are optional and are not limited as long as the present disclosure can be achieved.

Figure 6A:
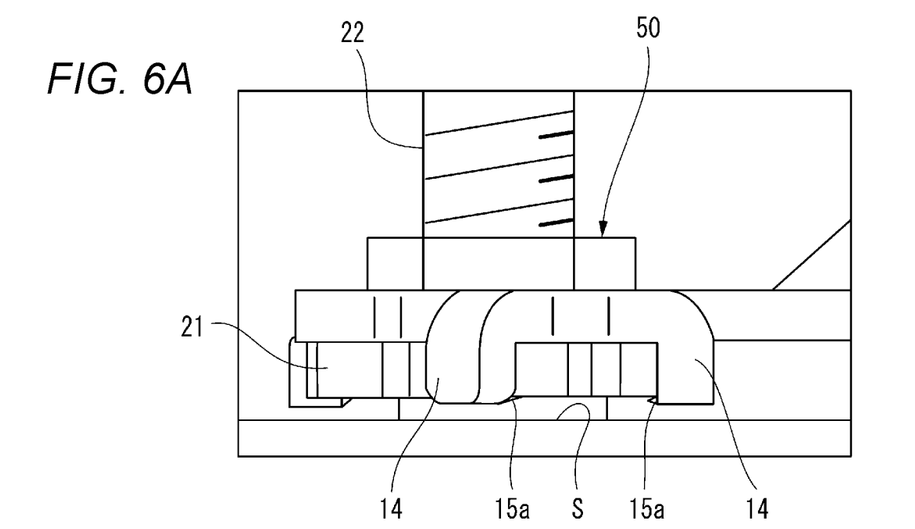
FIG. 6A is an enlarged view showing a mode in which a rotation stop portion is engaged with a seat.
Figure 6B:
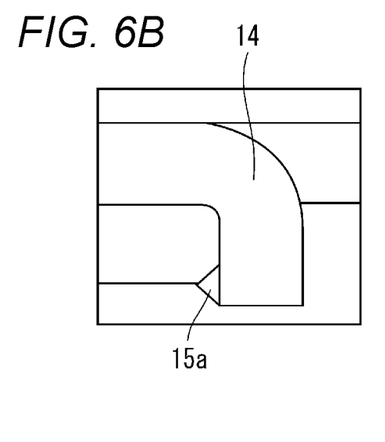
FIG. 6B is an enlarged view of an engaging portion in FIG. 6A, and FIG. 6C and FIG. 6D are views according to modifications of FIG. 6A.

For example, as shown in FIGS. 6A and 6B, the temporary locking protrusion 15a may be provided on the side face of the rotation stop portion 14. The temporary locking protrusion 15a is positioned in the gap S, and prevents the displacement of the ground terminal 10 in the upper-lower direction. Specifically, when the ground terminal 10 is moved with respect to the bolt 20 until the flat surface portion 11 contacts the seat 21, the temporary locking protrusion 15a is positioned in the gap S. At this time, even if the ground terminal 10 is displaced toward the upper side, the temporary locking protrusion 15a contacts a lower surface of the seat 21, so that the displacement of the ground terminal 10 in the upper-lower direction with respect to the bolt 20 is prevented.

Figure 6C:
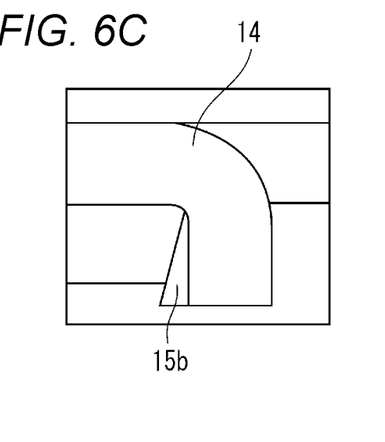
Figure 6D:
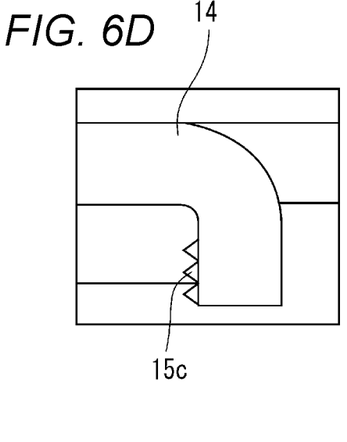

As shown in FIG. 6C, the inclined portion 15b may be provided instead of the temporary locking protrusion 15a. The inclined portion 15b preferably has a shape that approaches a central axis of the seat as an inclined surface moves downward. As shown in FIG. 6D, the plurality of small protrusions 15c may be provided instead of the temporary locking protrusion 15a. As described above, by being formed so that a part of the rotation stop portion 14 (temporary locking protrusion 15a, inclined portion 15b, and the plurality of small protrusions 15c) is positioned in the gap S, the displacement of the ground terminal 10 in the upper-lower direction with respect to the bolt 20 is prevented.

As described above, a terminal such as the ground terminal 10 is attachable to a bolt 20, the bolt protruding from a fixing member such as the body 30 and including a seat 21 separated from the fixing member, and the terminal is electrically connected to the fixing member when the terminal is attached to the bolt. The terminal includes: a flat surface portion 11; an extending portion 12 continuous with the flat surface portion and extending to form a same surface as a surface of which the flat surface portion extends; a branch portion 13 continuous with the extending portion and extending to form a same surface as the surface of which the flat surface portion extends, the branch portion 13 extending in a direction different from a direction in which the extending portion extends; and a plurality of rotation stop portions 14 continuous with the branch portion. When the terminal is attached to the bolt 20 by insertion of the bolt 20 into the flat surface portion 11, the flat surface portion 11 contacts the seat 21, the plurality of rotation stop portions 14 extend from the branch portion 13 toward a base end of the bolt 20 in a protruding direction of the bolt 20, and at least a pair of the plurality of rotation stop portions 14 are positioned to sandwich the seat 21 in a direction intersecting the protruding direction to prevent rotation of the terminal such as the ground terminal 10 with respect to the bolt 20.

According to the terminal, the terminal includes the flat surface portion that contacts the seat of the bolt, the extending portion extending to form the same surface as the surface of which the flat surface portion extends, the branch portion extending to form the same surface as the surface of which the flat surface portion extends and extending in the direction different from the direction in which the extending portion extends, and the plurality of rotation stop portions extending toward the base end in the protruding direction of the bolt. The terminal is attachable to the bolt including the seat separated from the fixing member, and is electrically connected to and fastened to the fixing member by the bolt. Specifically, when the bolt is inserted into the flat surface portion of the terminal, the flat surface portion contacts the seat to be electrically connected to the fixing member via the bolt. Then, by positioning at least a pair of rotation stop portions so as to sandwich the seat, the rotation of the terminal with respect to the bolt is prevented. Thus, in the terminal, since the rotation of the terminal is prevented, a complexity of the fixing operation of the terminal with respect to the fixing member is eliminated. In addition, since the terminal includes the extending portion and the branch portion extending to form the same surface as that of the flat surface portion, a contact area with the seat is increased, and thus conductivity with the fixing member is improved as compared with a terminal in the related art. As a result, the terminal is excellent in workability while improving the conductivity with the fixing member.

In the terminal, end surfaces of the rotation stop portion 14 are positioned closer to the base end than a surface of the seat 21 facing the fixing member.

According to the terminal, the end surface of the rotation stop portion is positioned closer to the base end in the protruding direction than the surface of the seat facing the fixing member, and compared with the terminal in the related art, the contact area (so-called engagement allowance) between the rotation stop portion and the seat is secured. As a result, in the terminal of the present configuration, the rotation of the terminal with respect to the bolt is prevented as compared with the terminal in the related art. Since the terminal is applicable to the bolt in which the seat is separated from the fixing member, the terminal can be configured as described above.

In the terminal, at lease one of the rotation stop portions 14 includes a temporary locking portion, such as the temporary locking protrusion 15a, the inclined portion 15b, and the plurality of small protrusions 15c, configured to be engaged with the seat 21.

According to the terminal, since the temporary locking portion, which is a part of the rotation stop portion, is configured to be engaged with the seat of the bolt, displacement along the standing direction is prevented. Specifically, even when the displacement in which the flat surface portion is separated from the seat along the standing direction occurs in the terminal, the temporary locking portion interferes with the seat. As a result, in the terminal of the present configuration, not only the rotation but also the displacement along the standing direction is prevented. Since the terminal of the present configuration is applied to the bolt in which the seat is separated from the fixing member, the terminal can be configured as described above.

A terminal fixing structure such as the fixing structure 1 includes: a bolt 20 protruding from a fixing member and including a seat separated from the fixing member; and the above-described terminal such as the ground terminal 10. The bolt 20 is inserted into the flat surface portion 11, and the flat surface portion 11 contacts the seat 12, and the rotation stop portions 14 of the terminal are positioned to sandwich the seat 21 to prevent rotation of the terminal with respect to the bolt 20.

According to the terminal fixing structure, the terminal is applied to the bolt including the seat separated from the fixing member. As a result, by an operation and effect of the terminal as described above, the fixing structure of the present configuration is also excellent in the workability while improving the conductivity between the terminal and the fixing member.

The invention claimed is:

1. A terminal attachable to a bolt, the bolt protruding from a fixing member and comprising a seat separated from the fixing member, the terminal being electrically connected to the fixing member when the terminal is attached to the bolt, the terminal comprising:
   a crimp portion configured to be crimped onto an electric wire;
   a flat surface portion extending from the crimp portion in a first direction and forming an end of the terminal in the first direction, the flat surface portion including,
      a through hole spaced away from the crimp portion in the first direction, and
      a straight outer edge extending in the first direction;
   an extending portion continuous with the flat surface portion and extending to form a same surface as a surface of which the flat surface portion extends, the extending portion extends from the straight outer edge of the flat surface portion in a second direction that is orthogonal to the first direction, the extending portion is spaced away from the end of the terminal;
   a branch portion continuous with the extending portion and extending to form a same surface as the surface of which the flat surface portion extends, the branch portion extending away from the extending portion in a direction different from each of the first direction and the second direction, the branch portion is spaced away from the end of the terminal; and
   a plurality of rotation stop portions continuous with the branch portion,
   wherein when the terminal is attached to the bolt by insertion of the bolt into the flat surface portion, the flat surface portion contacts the seat,
   the plurality of rotation stop portions extend from the branch portion toward a base end of the bolt in a protruding direction of the bolt, and
   at least a pair of the plurality of rotation stop portions are positioned to sandwich the seat in a direction intersecting the protruding direction to prevent rotation of the terminal with respect to the bolt.

2. The terminal according to claim 1, wherein end surfaces of the plurality of rotation stop portions are positioned closer to the base end than a surface of the seat facing the fixing member.

3. The terminal according to claim 1, wherein at least one of the plurality of rotation stop portions comprises a temporary locking portion configured to be engaged with the seat.

4. A terminal fixing structure comprising:
   a bolt protruding from a fixing member and comprising a seat separated from the fixing member; and
   the terminal according to claim 1,
   wherein the bolt is inserted into the flat surface portion, and the flat surface portion contacts the seat, and
   wherein the plurality of rotation stop portions of the terminal are positioned to sandwich the seat to prevent rotation of the terminal with respect to the bolt.

5. The terminal according to claim 1, wherein the plurality of rotation stop portions includes a first rotation stop portion, a second rotation stop portion, a third rotation stop portion, and a fourth rotation stop portion,
   wherein the pair of rotation stop portions includes the first rotation stop portion and the fourth rotation stop portion, the fourth rotation stop portion opposes the first rotation stop portion in the second direction.

6. The terminal according to claim 5, wherein the second rotation stop portion opposes the third rotation stop portion in the second direction, the second rotation stop portion opposes the first rotation stop portion in the first direction, and the third stop rotations portion opposes the fourth rotation stop portion in the first direction.

7. The terminal according to claim 5, wherein the extending portion includes a first extending portion and a second extending portion,
   wherein the branch portion includes a first branch portion and a second branch portion, each of the flat surface portion, the first extending portion, and the second extending portion are sandwiched between the first branch portion and the second branch portion, and
   wherein the first rotation stop portion is continuous with the first branch portion and the fourth rotation stop portion is continuous with the second branch portion.

8. The terminal according to claim 7, wherein the second rotation stop portion is continuous with the first branch portion and the third rotation stop portion is continuous with the second branch portion, and
   wherein the first rotation stop portion opposes the second rotation stop portion in the first direction and the third rotation stop portion opposes the fourth rotation stop portion in the first direction.

9. The terminal according to claim 5, wherein a first gap extends between the first branch portion and the flat surface portion, and a second gap extends between the second branch portion and the flat surface portion.

* * * * *